(12) United States Patent
Iwahara et al.

(10) Patent No.: US 6,625,475 B1
(45) Date of Patent: Sep. 23, 2003

(54) PORTABLE ELECTRONIC DEVICE

(75) Inventors: Hiroki Iwahara, Tama (JP); Yoshinori Horiguchi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 494 days.

(21) Appl. No.: 09/612,275

(22) Filed: Jul. 7, 2000

(30) Foreign Application Priority Data

Jul. 9, 1999 (JP) .......................................... 11-196701

(51) Int. Cl.[7] .............................. H04B 1/38; H04B 1/00
(52) U.S. Cl. ........................ 455/565; 455/70; 455/88; 455/127
(58) Field of Search ................................ 455/127, 501, 455/574, 90, 197.1, 456, 457, 70, 565, 66, 95, 68, 88, 67.7, 91; 340/551, 571, 825.3, 825.49

(56) References Cited

U.S. PATENT DOCUMENTS

| | | | | |
|---|---|---|---|---|
| 4,918,431 A | | 4/1990 | Borras | |
| 5,132,634 A | * | 7/1992 | Suarez | 330/129 |
| 5,832,386 A | * | 11/1998 | Nojima et al. | 455/465 |
| 5,940,764 A | * | 8/1999 | Mikami | 455/456 |
| 6,052,577 A | * | 4/2000 | Taguchi | 455/411 |
| 6,195,529 B1 | * | 2/2001 | Linz et al. | 455/1 |
| 6,246,891 B1 | * | 6/2001 | Isberg et al. | 455/574 |
| 6,301,486 B1 | * | 10/2001 | Tanaka | 455/522 |
| 6,343,213 B1 | * | 1/2002 | Steer et al. | 455/411 |
| 6,421,544 B1 | * | 7/2002 | Sawada | 455/565 |
| 6,438,385 B1 | * | 8/2002 | Heinonen et al. | 455/501 |
| 6,496,703 B1 | * | 12/2002 | da Silva | 455/456 |

FOREIGN PATENT DOCUMENTS

| | | | |
|---|---|---|---|
| JP | 10-320668 | | 12/1998 |
| WO | WO 98/344412 | * | 8/1998 |

* cited by examiner

*Primary Examiner*—Charles N. Appiah
(74) *Attorney, Agent, or Firm*—Finnegan, Henderson, Farabow, Garrett & Dunner, L.L.P.

(57) ABSTRACT

A portable electronic device includes a transmitting circuit, an X-ray detector, and a controller. The transmitting circuit includes a power amplifier for amplifying radio waves. The detector is arranged to detect X-rays radiated from an installation arranged on a passageway to an area where radiation of electromagnetic waves is restricted. When X-rays with a certain intensity or more are detected by the detector, a controller recognizes that the device is about to enter the area, and reduce the gain of the power amplifier, so that the transmitting circuit is set to be unable to radiate radio waves.

24 Claims, 2 Drawing Sheets

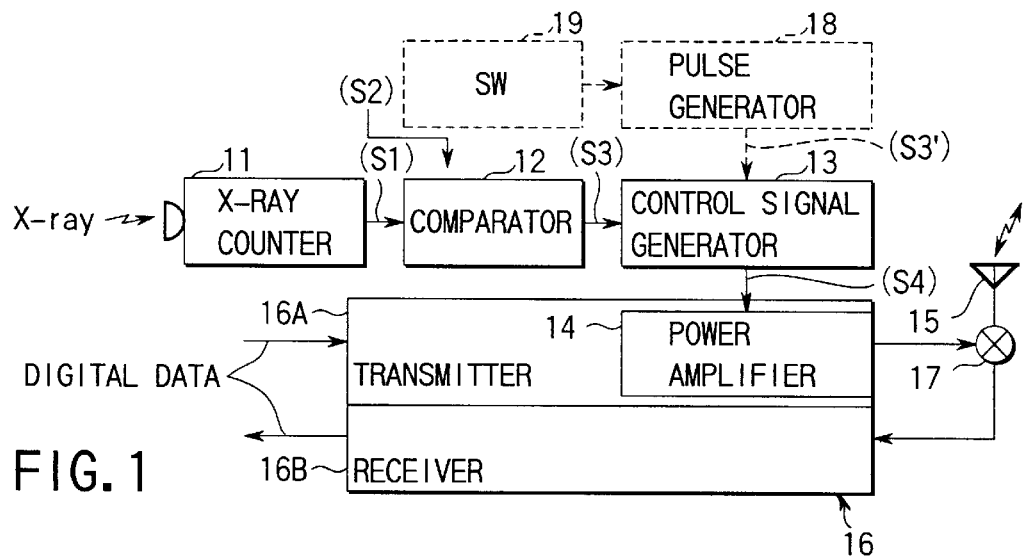
FIG. 1
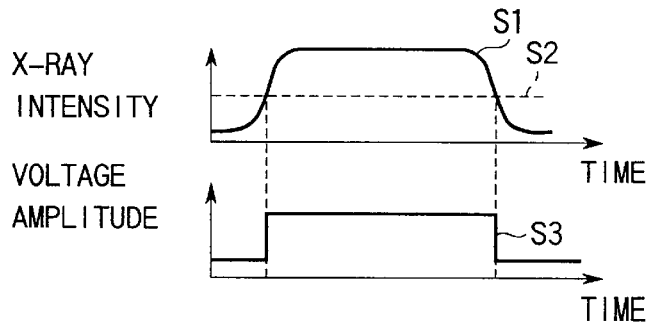
FIG. 2A
FIG. 2B
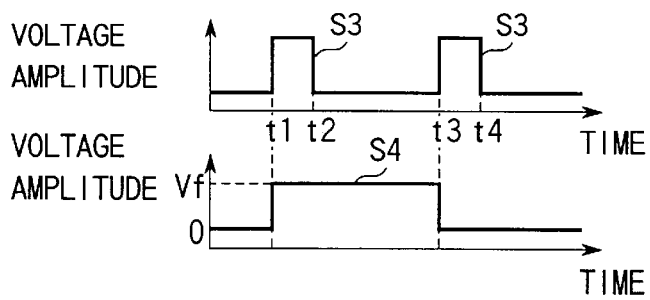
FIG. 3A
FIG. 3B

PORTABLE ELECTRONIC DEVICE

CROSS-REFERENCE TO RELATED APPLICATIONS

This application is based upon and claims the benefit of priority from the prior Japanese Patent Application No. 11-196701, filed Jul. 9, 1999, the entire contents of which are incorporated herein by reference.

BACKGROUND OF THE INVENTION

The present invention relates to a compact information-processing device, i.e., a portable electronic device, such as a portable terminal device, or a portable computer. More specifically, the present invention relates to a technique of controlling such an electronic device, when the device is carried into an area where radiation of electromagnetic waves is restricted, such as an airplane, air traffic control facilities, or medial treatment facilities.

For example, in an airplane and air traffic control facilities, radiation of electromagnetic waves from electronic devices carried therein from outside is strictly restricted to guarantee safe service.

Jpn. Pat. Appln. KOKAI Publication No. 10-320668 directed to an electromagnetic wave alarm apparatus discloses a conventional technique of restricting radiation of electromagnetic waves. This apparatus has a function of detecting and reporting that a person carrying a device, which radiates electromagnetic waves, comes within a certain distance. In other words, the apparatus can detect radiation of electromagnetic waves and report it as a warning, before a person carrying a device, which radiates electromagnetic waves, comes to a position where the device disturbs various facilities to be protected.

With the above described technique, it is possible to check, at the entrance gate of facilities, each device to be carried therein, whether it should be subjected to restriction of radiation of electromagnetic waves. However, once they are carried into the facilities, it is impossible to restrict their operation, and thus is difficult to obtain a sufficient check. Furthermore, the devices do not have any function of restraining themselves from radiating electromagnetic waves in areas where radiation of electromagnetic waves is restricted. Accordingly, with the above described technique, although it is possible to detect and report radiation of electromagnetic waves coming closer, it is impossible to shut down the radiation of electromagnetic waves.

BRIEF SUMMARY OF THE INVENTION

An object of the present invention is to provide a portable electronic device with a function of restraining itself from radiating electromagnetic waves in areas where radiation of electromagnetic waves is restricted, so that a reliable environment without any unnecessary electromagnetic waves is created in the areas.

According to a first aspect of the present invention, there is provided a portable electronic device comprising:

a main body which is changeable between a first state where the main body is able to generate a first electromagnetic wave at a first intensity or more, and a second state where the main body is unable to generate the first electromagnetic wave at the first intensity or more;

a detector configured to detect a second electromagnetic wave having a frequency different from that of the first electromagnetic wave; and a controller configured to set the main body at the second state on the basis of detection by the detector.

According to a second aspect of the present invention, there is provided a portable electronic device having a communicating unit for communicating with another device by using an electro magnetic wave, comprising:

a main body which is changeable between a first state where the main body is able to generate a first electromagnetic wave at a first intensity or more, and a second state where the main body is unable to generate the first electromagnetic wave at the first intensity or more;

a detector configured to detect a second electromagnetic wave radiated from an installation arranged on a passageway to an area where radiation of electromagnetic waves is restricted, the second electromagnetic wave having a frequency different from that of the first electromagnetic wave; and a controller configured to set the main body at the second state on the basis of detection by the detector.

According to a third aspect of the present invention, there is provided a method of controlling a portable electronic device including a main body which is changeable between a first state where the main body is able to generate a first electromagnetic wave at a first intensity or more, and a second state where the main body is unable to generate the first electromagnetic wave at the first intensity or more, the method comprising the steps of:

detecting by a detector a second electromagnetic wave radiated from an installation arranged on a passageway to an area where radiation of electromagnetic waves is restricted, the second electromagnetic wave having a frequency different from that of the first electromagnetic wave; and causing a controller to set the main body at the second state on the basis of detection by the detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the structure of the main part of an electronic device according to a first embodiment;

FIGS. 2A and 2B are signal wave diagrams showing an X-ray count signal and a detection signal, respectively, to explain operations of an X-ray counter and a comparator, according to the first embodiment;

FIGS. 3A and 3B are signal wave diagrams showing detection pulse signals and a circuit control signal, respectively, to explain an operation of a control signal generator, according to the first embodiment;

DETAILED DESCRIPTION OF THE INVENTION

Figure 4:
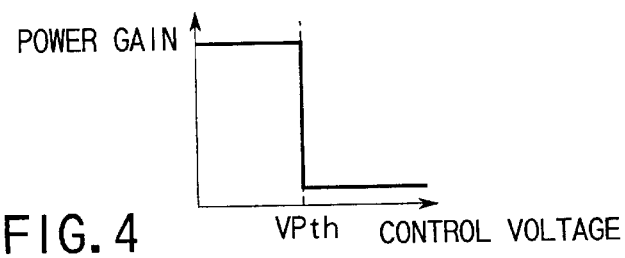
FIG. 4 is a diagram showing a change in the power gain on the basis of the circuit control signal of the control signal generator, to explain an operation of a power amplifier arranged in a transmitting circuit, according to the first embodiment.

At first, the first embodiment will be explained with reference to FIG. 1. In the first embodiment, when external X-rays with a certain intensity or more are detected, the gain of the power amplifier of a transmitting circuit, i.e., a circuit capable of radiating radio waves, arranged in the device is reduced. As a result, radio waves to be radiated from the antenna of the device are suppressed at a certain intensity or less.

FIG. 1 is a block diagram showing the structure of the main part of an electronic device according to the first embodiment. In FIG. 1, there is shown an X-ray counter 11, a comparator 12, a control signal generator 13, a transceiver antenna (aerial) 15, a transceiver 16, and an antenna sharing unit 17.

The transceiver 16 includes a transmitter 16A and a receiver 16B so as to perform data-communication with another device through the antenna 15. The transmitter 16A includes a power amplifier 14 as well as a signal processing unit (not shown) for packetizing data, etc., and a modulating circuit (not shown) for hopping frequencies, etc. The receiver 16B includes a demodulating circuit (not shown) for demodulating hopping-data, etc., and a signal processing unit (not shown) for depacketizing data, etc. Note that this constitution of the transceiver is common to the other embodiments described later.

The X-ray counter 11 counts the amount of X-rays per unit of time, and outputs the counted value as an X-ray count signal S1. The X-ray count signal S1 obtained by the X-ray counter 11 is inputted into the comparator 12.

The comparator 12 compares the counted value of the X-ray count signal S1 inputted from the X-ray counter 11 with a predetermined threshold value S2. When the counted value of the X-ray count signal S1 inputted from the X-ray counter 11 is larger than the threshold value S2, the comparator 12 outputs a detection pulse signal S3. The detection pulse signal S3 outputted from the comparator 12 is inputted into the control signal generator 13.

As the control signal generator 13, this embodiment utilizes a half-divider formed of a flip-flop. Accordingly, detection pulse signals S3 from the comparator 12 are subjected to a half-dividing process over their frequency by the control signal generator 13, and outputted as a circuit control signal S4. More specifically, when the control signal generator 13 receives a detection pulse signal S3 from the comparator 12, the generator 13 is triggered at the front edge or rising edge of the pulse signal to change into a set state and hold this state. Then, when the control signal generator 13 receives a detection pulse signal S3 again, the generator 13 is triggered at the front edge or rising edge of the pulse signal to change back into a reset state.

The circuit control signal S4 is inputted into the power amplifier 14 of the transmitting circuit. When the power amplifier 14 of the transmitting circuit receives the circuit control signal S4 from the control signal generator 13, it reduces the power gain down to a level at which transmission is impossible, in order to prevent radio waves from being radiated.

FIGS. 2A and 2B are signal wave diagrams showing an X-ray count signal S1 and a detection signal S3, respectively, to explain operations of the X-ray counter 11 and the comparator 12 shown in FIG. 1.

FIGS. 3A and 3B are signal wave diagrams showing detection pulse signals S3 and a circuit control signal S4, respectively, to explain an operation of the control signal generator 13 shown in FIG. 1.

FIG. 4 is a diagram showing a change in the power gain on the basis of the circuit control signal S4 of the control signal generator 13, to explain an operation of the power amplifier 14 arranged in the transmitting circuit shown in FIG. 1.

An explanation will be given of an operation of the electronic device according to the first embodiment with reference to FIGS. 1 to 4.

First, operations of the X-ray counter 11 and the comparator 12 will be explained with reference to FIGS. 2A and 2B. In FIG. 2A, there is shown the signal wave shape of a X-ray count signal S1 along with a threshold value S2, where the vertical and horizontal axes indicate X-ray intensity and time, respectively. In FIG. 2B, there is shown the signal wave shape of a detection pulse signal S3, where the vertical and horizontal axes indicate voltage amplitude and time, respectively.

It is supposed that X-rays of a certain intensity or more are radiated from an installation arranged on a passageway to an area where radiation of electromagnetic waves is restricted, e.g., an X-ray baggage examining machine arranged near a departure gate. When a passenger passes through the gate along with the electronic device, the amount of X-rays that the X-ray counter 11 receives gradually increases, then remains constant for a while, and then gradually decreases, with a lapse of time. As a result, an X-ray count signal S1 is outputted from the X-ray counter 11, as shown in FIG. 2A.

The X-ray count signal S1 having a wave shape shown in FIG. 2A from the X-ray counter 11 is inputted into the comparator 12, and compared with the threshold value 2 having a predetermined level. Then, that part of the X-ray count signal S1 which exceeds the threshold value S2 is outputted as a voltage wave shape of a pulse, i.e., a detection pulse signal S3.

The detection pulse signal S3 from the comparator 12 is inputted into the control signal generator 13 formed of a half-divider. It is supposed that the initial value of the control signal generator 13 is set at a "0" level output state. As shown in FIGS. 3A and 3B, the control signal generator 13 outputs a voltage signal of the "0" level as the circuit control signal S4 during "t≦t1", i.e., before the first pulse of "t1<t≦t2" is inputted. Then, the control signal generator 13 outputs a voltage signal of a "Vf" or "1" level as the circuit control signal S4 during "t1<t≦t3", i.e., before the next pulse of "t3<t≦t4" is inputted.

As described above, the output of the control signal generator 13 is inverted at every rising edge of inputted pulses, whereby the output takes the form of a signal including pulses with a half of the frequency of the inputted pulses. More specifically, when the control signal generator 13 receives the detection pulse signal S3 shown in FIG. 2B as the pulse of "t1<t≦t2" shown in FIG. 3A, it is triggered at the front edge "t1" of the pulse. As a result, the control signal generator 13 changes from the initial reset state, i.e., the "0" level output state, to the set state, i.e., the "1" or "Vf" level output state, and maintains the latter state, as shown in FIG. 3B. Then, when the control signal generator 13 again receives the detection pulse signal S3 shown in FIG. 2B as the pulse of "t3<t≦t4" shown in FIG. 3A, it is triggered at the front edge "t3" of the pulse. As a result, the control signal generator 13 changes from the set state, i.e., the "1" or "Vf" level output state, back to the initial reset state, i.e., the "0" level output state, as shown in FIG. 3B.

The circuit control signal S4 of two values thus generated in the control signal generator 13 is supplied to the power amplifier 14 of the transmitting circuit, whereby the operation of the power amplifier 14 is controlled in accordance with the signal. FIG. 4 is a diagram showing the power gain characteristic relative to the control voltage or circuit control signal S4 inputted in the power amplifier 14. In FIG. 4, there is shown a threshold value VPth (0<VPth<Vf) of the control voltage, where the vertical and horizontal axes indicate the power gain and the control voltage, respectively. The power amplifier 14 is arranged such that, while the control voltage is lower than the threshold value, i.e., within the periods of time of "t≦t1" and "t3<t", the power gain becomes larger, and on the other hand, while the control voltage is higher than the threshold value, i.e., within the period of time of "t1<t≦t3", the power gain becomes smaller.

The input terminal of the power amplifier 14 is supplied with a transmitting signal of an RF band outputted from the transceiver 16. The transmitting signal is changed of its power gain on the basis of the voltage of the circuit control signal S4, i.e., the "0" and "1 or Vf" levels, outputted from the control signal generator 13, and fed to the antenna 15 connected to the output terminal of the power amplifier 14.

As described above, according to the first embodiment of the present invention, when the device passes by an X-ray radiating installation, an X-ray detection pulse is outputted, thereby changing power gain of an RF signal to be transmitted from the antenna 15. Accordingly, it is possible to prevent electromagnetic waves from being radiated from the antenna 15 during the Vf level period of time of the circuit control signal S4.

Next, the second embodiment will be explained with reference to FIG. 5. In the second embodiment, when external X-rays with a certain intensity or more are detected, a transceiver circuit arranged in the device is forcedly switched from a transmitting mode to a receiving mode. As a result, radio waves to be radiated from the antenna of the device are suppressed at a certain intensity or less.

Figure 5:
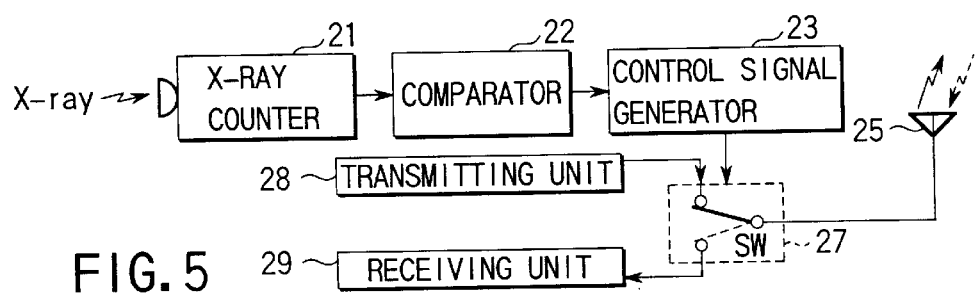
FIG. 5 is a block diagram showing the structure of the main part of an electronic device according to a second embodiment.

FIG. 5 is a block diagram showing the structure of the main part of an electronic device according to the second embodiment. In FIG. 5, there is shown an X-ray counter 21, a comparator 22, a control signal generator 23, a transceiver antenna 25, a switch 27 for switching between transmitting and receiving modes, a transmitting unit 28, and a receiving unit 29. Among them, the X-ray counter 21, comparator 22, and control signal generator 23 correspond to the X-ray counter 11, comparator 12, and control signal generator 13 of the first embodiment shown FIG. 1, respectively.

The X-ray counter 21 counts the amount of X-rays per unit of time, and outputs the counted value as an X-ray count signal. The X-ray count signal obtained by the X-ray counter 21 is inputted into the comparator 22.

The comparator 22 compares the counted value of the X-ray count signal inputted from the X-ray counter 21 with a predetermined threshold value. When the counted value of the X-ray count signal inputted from the X-ray counter 21 is larger than the threshold value, the comparator 22 outputs a detection pulse signal. The detection pulse signal outputted from the comparator 22 is inputted into the control signal generator 23.

When the control signal generator 23 receives detection pulse signals from the comparator 22, the generator 23 subjects the detection pulse signals to a half-dividing process over their frequency, and outputs a divided signal as a circuit control signal. More specifically, when the control signal generator 23 receives a detection pulse signal from the comparator 22, the generator 23 is triggered at the front edge or rising edge of the pulse signal to change into a set state and hold this state. Then, when the control signal generator 23 receives a detection pulse signal again, the generator 23 is triggered at the front edge or rising edge of the pulse signal to change back into a reset state. With the circuit control signal, the switch 27 for switching between transmitting and receiving modes is controlled and switched.

The switch 27 for switching between transmitting and receiving modes is arranged to selectively switch circuits to be connected to the transceiver antenna 25. In this embodiment, the switch 27 is arranged to alternatively select either the transmitting unit 28 or the receiving unit 29 to be connected to the transceiver antenna 25. The circuit control signal outputted from the control signal generator 23 has a voltage wave shape of a pulse, and the switch 27 for switching between transmitting and receiving modes is controlled to be switched by the voltage amplitude.

An explanation will be given of an operation of the second embodiment shown in FIG. 5. In this embodiment, that part of the operation which is performed up to a circuit control signal being outputted from the control signal generator 23 is easily understood from the first embodiment, and thus no explanation will be given of this part.

A half-divided signal obtained by the control signal generator 23, i.e., a control signal S4 shown in FIG. 3B, is used as a switching control signal to the switch 27 for switching between transmitting and receiving modes. Note that, however, the control signal is designed to control the switch 27 only when the circuit control signal S4 outputted from the control signal generator 23 has a signal voltage higher than a threshold value VCth (0<VCth<Vf).

While the outputted voltage from the control signal generator 23 is at the Vf level (t1<t≦t3), the switch 27 is fixed to a position for selecting the receiving unit 29. Even if the transceiver antenna 25 has been connected to the transmitting unit 28 beforehand, the transceiver antenna 25 is forcedly switched and connected to the receiving unit 29 in the period of time (t1<t≦t3). Accordingly, an RF transmitting signal outputted from the transmitting unit 28 is prevented from being radiated, and thus no electromagnetic waves are radiated from the transceiver antenna 25.

As described above, according to the second embodiment of the present invention, when the device passes by an X-ray radiating installation, an X-ray detection pulse is outputted, thereby controlling the switch 27 for switching between transmitting and receiving modes. Accordingly, it is possible to prevent radio waves from being radiated from the transceiver antenna 25 during the Vf level period of time of the circuit control signal S4 shown in FIG. 3B.

Next, the third embodiment will be explained with reference to FIG. 6. In the third embodiment, when external X-rays with a certain intensity or more are detected, a power supply for driving circuits arranged in the device is shut down. As a result, electromagnetic waves to be radiated from the internal circuit, which can be an electromagnetic wave source, of the device is suppressed at a certain intensity or less.

Figure 6:
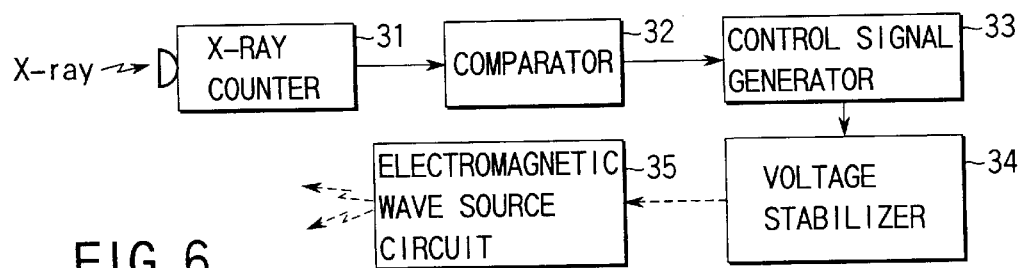
FIG. 6 is a block diagram showing the structure of the main part of an electronic device according to a third embodiment.

FIG. 6 is a block diagram showing the structure of the main part of an electronic device according to the third embodiment. In FIG. 3, there is shown an X-ray counter 31, a comparator 32, a control signal generator 33, a voltage stabilizer 34, and a circuit 35 which can be an electromagnetic wave source. Among them, the X-ray counter 31, comparator 32, and control signal generator 23 correspond to the X-ray counter 11, comparator 12, and control signal generator 13 of the first embodiment shown FIG. 1, respectively. Note that the circuit 35 may be any circuit except the X-ray counter 31, comparator 32, control signal generator 33, and voltage stabilizer 34, or may be a specific circuit which can radiate electromagnetic waves at a certain intensity.

The X-ray counter 31 counts the amount of X-rays per unit of time, and outputs the counted value as an X-ray count signal. The X-ray count signal obtained by the X-ray counter 31 is inputted into the comparator 32.

The comparator 32 compares the counted value of the X-ray count signal inputted from the X-ray counter 31 with a predetermined threshold value. When the counted value of the X-ray count signal inputted from the X-ray counter 31 is larger than the threshold value, the comparator 32 outputs a detection pulse signal. The detection pulse signal outputted from the comparator 32 is inputted into the control signal generator 33.

When the control signal generator 33 receives detection pulse signals from the comparator 32, the generator 33 subjects the detection pulse signals to a half-dividing process over their frequency, and outputs a divided signal as a circuit control signal. More specifically when the control signal generator 33 receives a detection pulse signal from the comparator 32, the generator 33 is triggered at the front edge or rising edge of the pulse signal to change into a set state and hold this state. Then, when the control signal generator 33 receives a detection pulse signal again, the generator 33 is triggered at the front edge or rising edge of the pulse signal to change back into a reset state. With the circuit control signal, the voltage stabilizer 34 is controlled.

An explanation will be given of an operation of the third embodiment shown in FIG. 6. In this embodiment, that part of the operation which is performed up to a circuit control signal being outputted from the control signal generator 33 is easily understood from the first embodiment, and thus no explanation will be given of this part.

Figure 7:
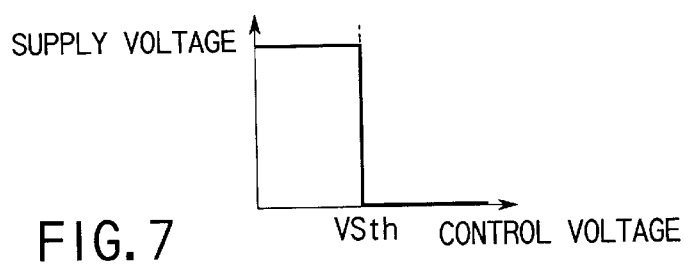
FIG. 7 is a diagram showing a change in the supply voltage of a circuit power supply on the basis of the control voltage (circuit control signal) inputted into a voltage stabilizer, according to the third embodiment.

A half-divided signal obtained by the control signal generator 33, i.e., a control signal S4 shown in FIG. 3B, is used as a control signal to the voltage stabilizer 34. FIG. 7 is a diagram showing a change in the supply voltage of a circuit power supply on the basis of the control voltage (circuit control signal S4) inputted into the voltage stabilizer 34. In FIG. 7, there is shown a threshold value VSth (0<VSth<Vf) of the control voltage, where the vertical and horizontal axes indicate the supply voltage to the circuit 35, and the control voltage, respectively.

Where the inputted control voltage (the circuit control signal S4 shown in FIG. 3B) is lower than the threshold value of VSth (t≦t1 and t3<t), the voltage stabilizer 34 causes the supply voltage to the circuit 35 to be increased up to the ordinary operation level. On the other hand, the control voltage is higher than the threshold value of VSth (t1t≦t3), the voltage stabilizer 34 causes the supply voltage to the circuit 35 to be reduced or shut out.

Accordingly, on the basis of the voltage of the control signal inputted into the voltage stabilizer 34, the voltage to be supplied to all the circuits (or specific circuits) connected to the voltage output terminal of the voltage stabilizer 34 is varied.

As described above, according to the third embodiment of the present invention, when the device passes by an X-ray radiating installation, an X-ray detection pulse is outputted, thereby controlling the supply voltage to the circuit 35 from the voltage stabilizer 34, so that the power supply of the device is controlled to be turned on/off. Accordingly, it is possible to prevent electromagnetic waves from being radiated from the internal circuit of the device during the Vf level period of time of the circuit control signal S4 shown in FIG. 3B.

In the first to third embodiments, the circuits on which radiation of electromagnetic waves is restricted are re-enabled to operate when X-rays with a certain intensity or more are detected again. However, the present invention is not limited to the embodiments. For example, the circuits on which radiation of electromagnetic waves is restricted may be re-enabled to operate by a predetermined operation, such as an input operation through a specific key, or an operation through a switch dedicated to a re-enabling operation.

An example of an additional structure necessary for such a modification is shown with the broken lines in FIG. 1. Specifically, the additional structure includes a pulse generator 18 connected to the control signal generator 13 and configured to generate a dummy pulse signal S3' similar to a detection signal S3 outputted from the comparator 12. The pulse generator 18 is turned on/off by an operation switch 19. An operation of this modification is as follows.

As described above, when the device passes by an X-ray radiating installation, a detection pulse signal S3 is inputted from the comparator 12 into the control signal generator 13. The control signal generator 13 is triggered at the front edge, corresponding to t1 shown in FIGS. 3A and 3B, of the detection signal S3, whereby the control signal generator 13 changes from the initial reset state, i.e., the "0" level output state, to the set state, i.e., the "1" or "Vf" level output state, and maintains the latter state. Then, when the pulse generator 18 is turned on, e.g., manually, by the operation switch 19, a dummy signal S3' similar to the detection signal S3 is inputted from the pulse generator 18 into the control signal generator 13. The control signal generator 13 is triggered at the front edge, corresponding to t3 shown in FIGS. 3A and 3B, of the dummy signal S3', whereby the control signal generator 13 changes from the set state, i.e., the "1" or "Vf" level output state back to the initial reset state, i.e., the "0" level output state.

In place of the above described design, the device may be designed such that it can be turned back to an ordinary operation state by operating a power switch after a predetermined period of time, such as 12 hours, or 24 hours. As in the modifications described above, a circuit on which radiation of electromagnetic waves is restricted may be re-enabled to operate by a mechanism other than the mechanisms adopted in the first to third embodiments.

In the embodiments, the operation of the internal circuits are controlled by measuring the intensity of external X rays, but the present invention is not limited thereto. For example, the operation of the internal circuits may be controlled by measuring the intensity of external electromagnetic waves, such as radio waves. Furthermore, different electromagnetic waves may be used as detection targets (if necessary, different threshold values are set for the different electromagnetic waves), so that the operation of the internal circuits can be controlled even when electromagnetic waves to be detected differ between the entrance and exit of an area where radiation of electromagnetic waves is restricted. In any case, external electromagnetic waves used as detection targets should have a frequency different from that of electromagnetic waves generated from the internal circuits.

As described above, according to the present invention, there is provided a portable electronic device with a function of restraining itself from radiating electromagnetic waves in areas where radiation of electromagnetic waves is restricted. As a result, a reliable environment without any unnecessary electromagnetic waves is created in the areas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic device comprising:
    a main body which is changeable between a first state where the main body is able to generate a first electromagnetic wave at a first intensity or more, and a second state where the main body is unable to generate the first electromagnetic wave at the first intensity or more;
    a detector configured to detect a second electromagnetic wave having a frequency different from that of the first electromagnetic wave; and
    a controller configured to set the main body at the second state on the basis of detection by the detector;
    wherein the controller comprises a comparator configured to compare a detection value of the second electromagnetic wave detected by the detector with a predetermined threshold value, and a control signal generator configured to generate a control signal in accordance with a comparison result obtained by the comparator;
    wherein the comparator is configured to output a detection signal when the detection value is larger than the threshold value, and the control signal generator is configured to be triggered at a rising edge of the detection signal and to invert its own output to be the control signal.

2. The device according to claim 1, wherein the detector is configured to set the main body at the second state, at a first point in time when the second electromagnetic wave detected by the detector has a second intensity or more.

3. The device according to claim 2, wherein the detector is configured to detect a third electromagnetic wave having a frequency different from that of the first electromagnetic wave, and the controller is configured to change the main body from the second state to the first state, at a second point in time when the third electromagnetic wave detected by the detector has a third intensity or more after the first point in time.

4. The device according to claim 3, wherein the frequencies of the second and third electromagnetic waves are substantially the same, and the second and third intensities are substantially the same, and the controller is configured to change the main body from the second state to the first state, at the second point in time when the second electromagnetic wave detected by the detector comes back to have the second intensity or more after the first point in time.

5. The device according to claim 1, further comprising an operation section configured to perform an operation for changing the main body from the second state to the first state.

6. The device according to claim 1, wherein the main body comprises a main circuit for generating the first electromagnetic wave, and an amplifier for amplifying the first electromagnetic wave, and the controller is configured to control gain of the amplifier to change the main body between the first and second states.

7. The device according to claim 1, wherein the main body comprises a main circuit for generating the first electromagnetic wave, a radiation member for radiating the first electromagnetic wave, and a switching circuit for selectively connecting the main circuit to the radiation member, and the controller is configured to control the switching circuit to change the main body between the first and second states.

8. The device according to claim 7, wherein the main body comprises a transmitting unit functioning as the main circuit, and a receiving unit, and the switching circuit is configured to selectively connect the transmitting unit and the receiving unit to the radiation member in accordance with the first and second states, respectively.

9. The device according to claim 1, wherein the main body comprises a main circuit, which is able to generate the first electromagnetic wave, and a power supply circuit, and the controller is configured to control a voltage from the power supply circuit to the main circuit to change the main body between the first and second states.

10. The device according to claim 1, wherein the control signal generator comprises a half-divider.

11. The device according to claim 1, further comprising a dummy signal generator configured to supply the control signal generator with a dummy signal similar to the detection signal, and an operation switch configured to turn on/off the dummy signal generator.

12. The device according to claim 1, wherein the first electromagnetic wave comprises a radio wave, and the main body is configured to transmit the first electromagnetic wave.

13. The device according to claim 1, wherein the second electromagnetic wave comprises X-rays.

14. A portable electronic device having a communicating unit for communicating with another device by using an electro magnetic wave, comprising:
    a main body which is changeable between a first state where the main body is able to generate a first electromagnetic wave at a first intensity or more, and a second state where the main body is unable to generate the first electromagnetic wave at the first intensity or more;
    a detector configured to detect a second electromagnetic wave radiated from an installation arranged on a passageway to an area where radiation of electromagnetic waves is restricted, the second electromagnetic wave having a frequency different from that of the first electromagnetic wave;
    a controller configured to set the main body at the second state on the basis of detection by the detector;
    wherein the controller comprises a comparator configured to compare a detection value of the second electromagnetic wave detected by the detector with a predetermined threshold value, and a control signal generator configured to generate a control signal in accordance with a comparison result obtained by the comparator;
    wherein the comparator is configured to output a detection signal when the detection value is larger than the threshold value, and the control signal generator is configured to be triggered at a rising edge of the detection signal and to invert its own output to be the control signal.

15. The device according to claim 14, wherein the controller is configured to recognize that the device is about to enter the area where radiation of electromagnetic waves is restricted, and set the main body at the second state, at a first point in time when the second electromagnetic wave detected by the detector has a second intensity or more.

16. The device according to claim 15, wherein the controller is configured to change the main body from the second state to the first state, at a second point in time when the second electromagnetic wave detected by the detector comes back to have the second intensity or more after the first point in time.

17. The device according to claim 14, further comprising an operation section configured to perform an operation for changing the main body from the second state to the first state.

18. A portable electronic device comprising:
    an antenna;
    a transceiver coupled to the antenna and configured to output a first radio wave of a predetermined intensity through the antenna for communication; and
    a detector configured to detect a second radio wave and output a control signal so as to reduce the intensity of the first radio wave;
    wherein said detector comprises:
        a controller comprising a comparator configured to compare a detection value of the second radio wave detected by the detector with a predetermined threshold value, and a control signal generator configured to generate a control signal in accordance with a comparison result obtained by the comparator;
        wherein the comparator is configured to output a detection signal when the detection value is larger than the threshold value, and the control signal generator is configured to be triggered at a rising edge of the detection signal and to invert its own output to be the control signal.

19. A portable electronic device comprising:
    means for communicating with another device by using a first radio wave of a predetermined intensity;
    means for detecting a second radio wave; and
    means for reducing the intensity of the first radio wave on the basis of detection of the second radio wave;
    wherein said means for reducing comprises:
        a controller comprising a comparator configured to compare a detection value of the second electromagnetic wave detected by the detector with a predetermined threshold value, and a control signal generator configured to generate a control signal in accordance with a comparison result obtained by the comparator;
        wherein the comparator is configured to output a detection signal when the detection value is larger than the threshold value, and the control signal generator is configured to be triggered at a rising edge of the detection signal and to invert its own output to be the control signal.

20. A method of controlling a portable electronic device including a main body which is changeable between a first state where the main body is able to generate a first electromagnetic wave at a first intensity or more, and a second state where the main body is unable to generate the first electromagnetic wave at the first intensity or more, the method comprising the steps of:
    detecting by a detector a second electromagnetic wave radiated from an installation arranged on a passageway to an area where radiation of electromagnetic waves is restricted, the second electromagnetic wave having a frequency different from that of the first electromagnetic wave; and
    causing a controller to set the main body at the second state on the basis of detection by the detector;
    wherein the causing a controller step further comprises the steps of:
        comparing a detection value of the second electromagnetic wave detected by the detector with a predetermined threshold value,
        generating a control signal in accordance with a comparison result obtained by the comparator by generating an output triggered at a rising edge of a detection signal and inverting said output; and
        outputting the detection signal when the detection value is larger than the threshold value.

21. The method according to claim 20, wherein the step of causing a controller to set the main body at the second state comprises a step of causing the controller to recognize that the device is about to enter the area where radiation of electromagnetic waves is restricted, and set the main body at the second state, at a first point in time when the second electromagnetic wave detected by the detector has a second intensity or more.

22. The method according to claim 21, further comprising a step of causing the controller to change the main body from the second state to the first state, at a second point in time when the second electromagnetic wave detected by the detector comes back to have the second intensity or more after the first point in time.

23. The method according to claim 20, wherein the second electromagnetic wave comprises X-rays.

24. A method for changing a radio intensity of a portable electric device, comprising the steps of:
    communicating with another device by using a first radio wave of a predetermined intensity;
    detecting a second radio wave; and
    reducing the intensity of the first radio wave on the basis of detection of the second radio wave;
    wherein the reducing the intensity step further comprises the steps of:
        comparing a detection value of the second electromagnetic wave detected by the detector with a predetermined threshold value;
        generating a control signal in accordance with a comparison result obtained by the comparator by generating an output triggered at a rising edge of a detection signal and inverting said output; and
        outputting the detection signal when the detection value is larger than the threshold value.

* * * * *